(12) United States Patent
Chou

(10) Patent No.: US 9,999,023 B2
(45) Date of Patent: Jun. 12, 2018

(54) COORDINATION OF CAPACITY AND COVERAGE OPTIMIZATION OF SELF-ORGANIZING NETWORKS

(71) Applicant: Intel IP Corporation, Santa Clara, CA (US)

(72) Inventor: Joey Chou, Scottsdale, AZ (US)

(73) Assignee: Intel IP Corporation, Santa Clara, CA (US)

( * ) Notice: Subject to any disclaimer, the term of this patent is extended or adjusted under 35 U.S.C. 154(b) by 170 days.

(21) Appl. No.: 14/765,524

(22) PCT Filed: Dec. 26, 2013

(86) PCT No.: PCT/US2013/077748
§ 371 (c)(1),
(2) Date: Aug. 3, 2015

(87) PCT Pub. No.: WO2014/133662
PCT Pub. Date: Sep. 4, 2014

(65) Prior Publication Data
US 2015/0373563 A1    Dec. 24, 2015

Related U.S. Application Data

(60) Provisional application No. 61/771,698, filed on Mar. 1, 2013.

(51) Int. Cl.
*H04W 72/00* (2009.01)
*H04B 7/04* (2017.01)
(Continued)

(52) U.S. Cl.
CPC ........ *H04W 72/005* (2013.01); *H04B 7/0452* (2013.01); *H04B 7/0486* (2013.01);
(Continued)

(58) Field of Classification Search
CPC ... H04W 72/005; H04W 76/02; H04W 72/10; H04W 4/10; H04W 12/02; H04W 12/04;
(Continued)

(56) References Cited

U.S. PATENT DOCUMENTS

| | | | | |
|---|---|---|---|---|
| 2012/0059923 A1* | 3/2012 | Cleary | ................ | H04W 24/00 709/223 |
| 2012/0275315 A1* | 11/2012 | Schlangen | ............ | H04W 24/02 370/242 |

FOREIGN PATENT DOCUMENTS

| | | |
|---|---|---|
| KR | 1020020053444 A | 7/2002 |
| KR | 1020050063652 A | 6/2005 |
| WO | 2011151684 A1 | 12/2011 |

OTHER PUBLICATIONS

International Search Report and Written Opinion received for PCT Application No. PCT/US2013/077748, dated Apr. 22, 2014, 13 pages.

(Continued)

*Primary Examiner* — Curtis A Alia
(74) *Attorney, Agent, or Firm* — Grossman, Tucker, Perreauly & Pfleger, PLLC

(57) ABSTRACT

In one embodiment, the present disclosure provides a self-optimizing network (SON) coordination module that includes a conflict detection module configured to receive operational information from at least one capacity and coverage optimization (CCO) module and at least one of an energy savings management (ESM) and/or a cell outage compensation (COC) module, wherein the at least one CCO module and the at least one of the ESM module and/or the COC module are associated with at least one eNodeB (eNB) in communication with the conflict detection module. The conflict detection module is configured to determine a conflict between operational information of the CCO module and at least one of the ESM module and/or the COC (Continued)

module. The SON coordination module also includes a conflict resolution module configured to resolve a conflict between the operational information of the CCO module and at least one of the ESM module and/or the COC module based on, at least in part, one or more conflict resolution rules.

24 Claims, 4 Drawing Sheets

(51) Int. Cl.
| | | |
|---|---|---|
| H04B 7/0452 | (2017.01) | |
| H04W 36/14 | (2009.01) | |
| H04W 36/22 | (2009.01) | |
| H04L 5/00 | (2006.01) | |
| H04L 12/741 | (2013.01) | |
| H04B 7/06 | (2006.01) | |
| H04W 24/10 | (2009.01) | |
| H04W 72/04 | (2009.01) | |
| H04W 72/08 | (2009.01) | |
| H04L 29/06 | (2006.01) | |
| H04L 29/08 | (2006.01) | |
| H04W 4/10 | (2009.01) | |
| H04W 12/02 | (2009.01) | |
| H04W 12/04 | (2009.01) | |
| H04W 76/02 | (2009.01) | |
| H04W 24/02 | (2009.01) | |
| H04W 24/08 | (2009.01) | |
| H04L 12/18 | (2006.01) | |
| H04W 52/24 | (2009.01) | |
| H04W 72/10 | (2009.01) | |
| H04W 16/14 | (2009.01) | |
| H04W 76/04 | (2009.01) | |
| H04W 36/16 | (2009.01) | |
| H04W 36/30 | (2009.01) | |
| H04J 3/12 | (2006.01) | |
| H04W 48/10 | (2009.01) | |
| H04W 48/20 | (2009.01) | |
| H04M 15/00 | (2006.01) | |
| H04L 25/03 | (2006.01) | |
| H04W 4/00 | (2018.01) | |
| H04W 88/06 | (2009.01) | |
| H04W 88/02 | (2009.01) | |
| H04W 88/08 | (2009.01) | |
| H04W 84/18 | (2009.01) | |
| H04W 4/06 | (2009.01) | |

(52) U.S. Cl.
CPC .............. *H04B 7/0626* (2013.01); *H04J 3/12* (2013.01); *H04L 5/0037* (2013.01); *H04L 12/184* (2013.01); *H04L 25/03* (2013.01); *H04L 45/74* (2013.01); *H04L 65/4038* (2013.01); *H04L 65/608* (2013.01); *H04L 65/80* (2013.01); *H04L 67/02* (2013.01); *H04M 15/8044* (2013.01); *H04W 4/10* (2013.01); *H04W 12/02* (2013.01); *H04W 12/04* (2013.01); *H04W 16/14* (2013.01); *H04W 24/02* (2013.01); *H04W 24/08* (2013.01); *H04W 24/10* (2013.01); *H04W 36/14* (2013.01); *H04W 36/165* (2013.01); *H04W 36/22* (2013.01); *H04W 36/30* (2013.01); *H04W 48/10* (2013.01); *H04W 48/20* (2013.01); *H04W 52/244* (2013.01); *H04W 72/044* (2013.01); *H04W 72/0406* (2013.01); *H04W 72/085* (2013.01); *H04W 72/087* (2013.01); *H04W 72/10* (2013.01); *H04W 76/02* (2013.01); *H04W 76/023* (2013.01); *H04W 76/04* (2013.01); *H04W 76/046* (2013.01); *H04W 4/008* (2013.01); *H04W 4/06* (2013.01); *H04W 84/18* (2013.01); *H04W 88/02* (2013.01); *H04W 88/06* (2013.01); *H04W 88/08* (2013.01); *Y02D 70/1224* (2018.01); *Y02D 70/1242* (2018.01); *Y02D 70/1244* (2018.01); *Y02D 70/1246* (2018.01); *Y02D 70/1262* (2018.01); *Y02D 70/1264* (2018.01); *Y02D 70/142* (2018.01); *Y02D 70/144* (2018.01); *Y02D 70/146* (2018.01); *Y02D 70/162* (2018.01); *Y02D 70/164* (2018.01); *Y02D 70/166* (2018.01); *Y02D 70/168* (2018.01); *Y02D 70/21* (2018.01); *Y02D 70/22* (2018.01); *Y02D 70/23* (2018.01); *Y02D 70/26* (2018.01); *Y02D 70/444* (2018.01)

(58) Field of Classification Search
CPC ... H04W 72/087; H04W 24/02; H04W 24/08; H04W 52/244; H04W 72/044; H04W 4/06; H04W 88/06; H04W 4/008; H04W 24/10; H04W 48/10; H04W 48/20; H04W 72/0406; H04W 76/023; H04W 76/04; H04W 36/30; H04W 76/046; H04W 36/165; H04W 16/14; H04W 72/085; H04W 36/14; H04W 36/22; H04W 88/08; H04W 84/18; H04W 88/02; H04M 15/8044; H04J 3/12; H04L 12/184; H04L 45/74; H04L 5/0037; H04L 25/03; H04L 65/4038; H04L 65/608; H04L 65/80; H04L 67/02; H04L 65/02; H04B 7/0626; H04B 7/0452; H04B 7/0486; Y02B 60/50
See application file for complete search history.

(56) References Cited

OTHER PUBLICATIONS

3GPP TS 32.622, 3rd Generation Partnership Project; Technical Specification Group Services and System Aspects; Telecommunication management; Configuration Management (CM); Generic network resources Integration Reference Point (IRP); Network Resource Model (NRM) (Release 8); V8.1.0 (Mar. 2008), 27 pages.
3GPP TS 23.682, 3rd Generation Partnership Project; Technical Specification Group Services and System Aspects; Architecture enhancements to facilitate communications with packet data networks and applications (Release 11), V11.1.0 (Jun. 2012), 27 pages.
3GPP TR 22.934, 3rd Generation Partnership Project; Technical Specification Group Services and System Aspects; Feasibility study on 3GPP system to Wireless Local Area Network (WLAN) interworking (Release 8), V8.0.0 (Dec. 2008), 30 pages.
3GPP TS 32.762, 3rd Generation Partnership Project; Technical Specification Group Services and System Aspects; Telecommunication management; Evolved Universal Terrestrial Radio Access Network (E-UTRAN) Network Resource Model (NRM) Integration Reference Point (IRP); Information Service (IS) (Release 11), V11.7.0 (Mar. 2014), 59 pages.
3GPP TS 32.796, 3rd Generation Partnership Project; Technical Specification Group Services and System Aspects; Telecommunication management; Generic Radio Access Network (RAN) Network Resource Model (NRM) Integration Reference Point (IRP); Solution Set (SS) definitions (Release 11), 21 pages.
3GPP TS 36.212, 3rd Generation Partnership Project; Technical Specification Group Radio Access Network; Evolved Universal Terrestrial Radio Access (E-UTRA); Multiplexing and channel coding (Release 10), V10.1.0 (Mar. 2011), 76 pages.

(56) References Cited

OTHER PUBLICATIONS

3GPP TS 36.211, 3rd Generation Partnership Project; Technical Specification Group Radio Access Network; Evolved Universal Terrestrial Radio Access (E-UTRA); Physical Channels and Modulation (Release 10), V10.1.0 (Mar. 2011), 103 pages.
3GPP TS 23.221, 3rd Generation Partnership Project; Technical Specification Group Services and System Aspects—Architectural requirements (Release 8), V8.8.0 (Mar. 2011), 47 pages.
3GPP TS 24.301, Universal Mobile Telecommunications System (UMTS); LTE; Non-Access-Stratum (NAS) protocol for Evolved Packet System (EPS); Stage 3 (Release 10), V.10.3.0 (Jun. 2011), 308 pages.
3GPP TS 36.413, LTE; Evolved Universal Terrestrial Radio Access Network (E-UTRAN); S1 Application Protocol (S1AP) (Release 10), V.10.5.0 (Mar. 2012), 262 pages.
3GPP TS 33.401, Digital cellular telecommunications system (Phase 2+); Universal Mobile Telecommunications System (UMTS); LTE; 3GPP System Architecture Evolution (SAE); Security architecture (Release 10), V.10.3.0 (Jul. 2012), 118 pages.
3GPP TS 28.628, 3rd Generation Partnership Project; Technical Specification Group Services and System Aspects; Telecommunication management; Self-Organizing Networks (SON) Policy Network Resource Model (NRM) Integration Reference Point (IRP); Information Service (IS) (Release 11), V11.0.0 (Dec. 2012), 40 pages.
International Preliminary Report on Patentability and Written Opinion received for PCT Application No. PCT/US2013/077748, dated Sep. 11, 2015.
Japanese Office Action dated Aug. 2, 2016 issued in Japanese Application No. 2015-560174, with English translation, 14 pages.
Korean Office Action dated Jul. 18, 2016 issued in Korean Application No. 10-2015-7020761, with English translation, 11 pages.
KR Reference 1: 3GPP TS 32.522 v11.4.0 (Dec. 2012), 3rd Generation Partnership Project, 50 pages.
KR Reference 2: 3GPP TSG-SA5 Meeting #87, Jan. 14-18, 2013, Malta, Change Request 32.522 CR 0133, 3 pages.
KR Reference 3: 3GPP TSG-SA5 Meeting #87, Jan. 14-18, 2013, Malta, Change Request 32.762 CR 0095, 8 pages.
Extended European Search Report dated Jul. 14, 2016 issued in European Application No. 13876584.7, 6 pages.
EP Search Report Reference 1: 3GPP TS 28.628 v11.0.0 (Dec. 2012), 3rd Generation Partnership Project, 40 pages.
Japanese Decision of Refusal issued in Japanese Application No. 2015-560174, dated Apr. 18, 2017, with English machine translation, 2 pages.
Chinese Office Action issued in Chinese Application No. 201380071447.1, dated Nov. 28, 2017, with English machine translation, 23 pages.

* cited by examiner

COORDINATION OF CAPACITY AND COVERAGE OPTIMIZATION OF SELF-ORGANIZING NETWORKS

CROSS-REFERENCE TO RELATED APPLICATIONS

The present patent application is related to and claims priority to U.S. Provisional Patent Application Ser. No. 61/771,698, filed Mar. 1, 2013, the contents of which are incorporated herein by reference in their entirety.

FIELD

The present disclosure relates to coordinating functions, and more particularly, to coordination of capacity and coverage optimization of self-organizing networks.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Although the following Detailed Description will proceed with reference being made to illustrative embodiments, many alternatives, modifications, and variations thereof will be apparent to those skilled in the art.

DETAILED DESCRIPTION

Generally, this disclosure provides devices, systems and methods for coordinating various operations associated with eNBs. In one example embodiment, A self-optimizing network (SON) coordination module is provided that is configured to receive operational information from at least one capacity and coverage optimization (CCO) module and at least one of an energy savings management (ESM) and/or a cell outage compensation (COC) module, wherein the at least one CCO module and the at least one of the ESM module and/or the COC module are associated with at least one eNodeB (eNB). The SON coordination module is configured to determine a conflict between operational information of the CCO module and at least one of the ESM module and/or the COC module. The SON coordination module is also configured to resolve a conflict between the operational information of the CCO module and at least one of the ESM module and/or the COC module based on, at least in part, one or more conflict resolution rules.

Figure 1:
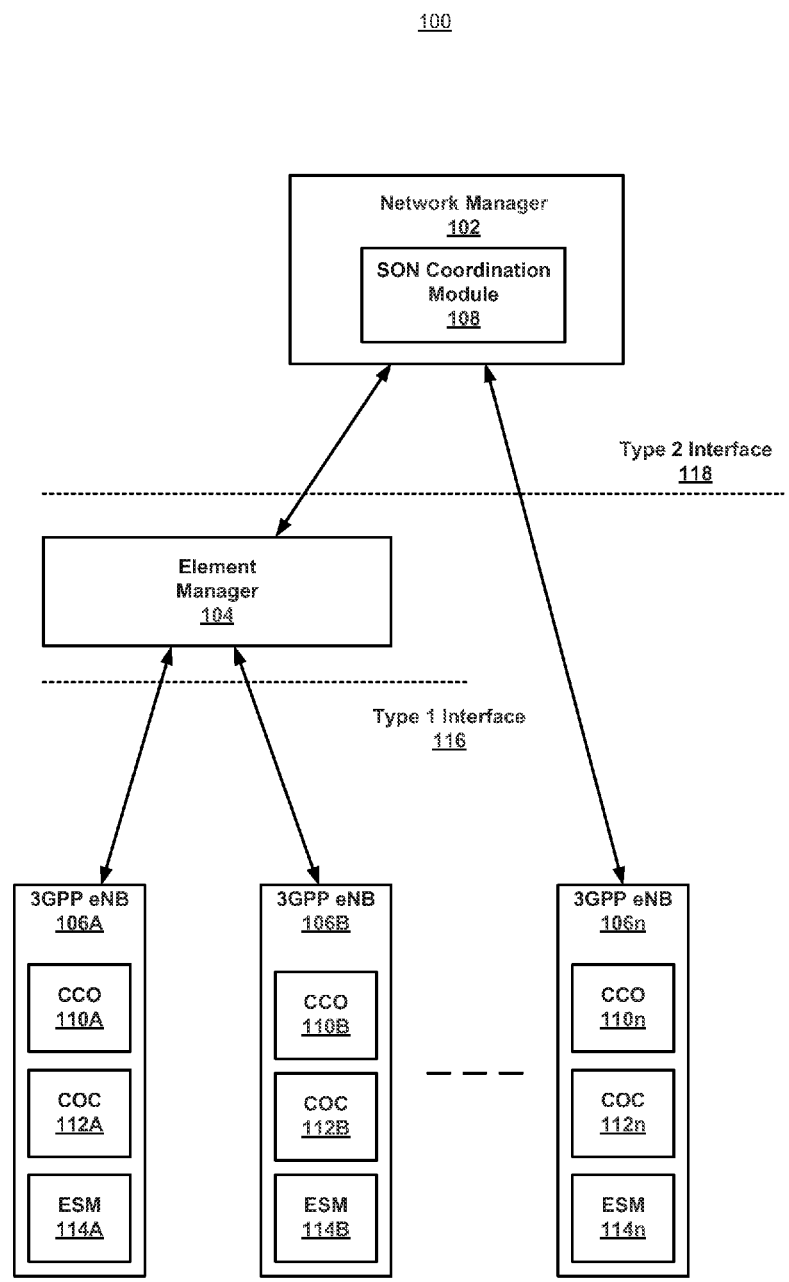
FIG. 1 illustrates an example wireless network system according to various embodiments of the present disclosure.

FIG. 1 illustrates an example wireless network system diagram 100 according to various embodiments of the present disclosure. The wireless system 100 includes a plurality of hardware devices, hardware platforms and associated signaling, functionality, software and definition which may generally comply with, or otherwise be compatible with, the Third Generation Partnership Project (3GPP) Long Term Evolution (LTE) and/or LTE-Advanced (LTE-A) based wireless network standard, including current, previous and future versions of that standard. These may include, for example, 3GPP TS 36.212: "Evolved Universal Terrestrial Radio Access (E-UTRA); Multiplexing and channel coding", 3GPP TS 36.211: "Evolved Universal Terrestrial Radio Access (E-UTRA); Physical channels and modulation", 3GPP TS 23.221, 3GPP TS 24.301, 3GPP TS 36.413, 3GPP TS 33.401, etc. Reference to hardware platforms and/or software modules (e.g., UE, eNodeB, eNB, NB, EM, NM, COC, CCO, etc.) and associated signaling and functionality, as used herein, may be generally defined by the aforementioned 3GPP standards, and/or derivatives thereof.

The wireless network 100 includes a network manager (NM) 102, at least one element manager (EM) 104, and a plurality of eNodeBs (eNBs) 106A, 106B, . . . , 106(n). In this example, eNB 106A and 106B are configured to communicate with the NM 102 via the EM 104, and eNB 106n is configured to communicate with the NM 102, in which case, in some embodiments, eNB 106n may include an EM to facilitate such communication.\. Each eNB 106A, 106B, . . . , 106n is generally configured to provide cell coverage areas (not shown in this Figure). In some embodiments, one or more eNBs may be operable to cover a single cell area, while in other embodiments, at least one eNB may be operable to cover multiple cells or sectors, while in other embodiments, at least one cell may be partitioned so that multiple eNBs cover that cell. While this is a simplified example, for illustration purposes, it will be appreciated that in practice any configuration of eNBs, UEs and WLAN APs of various types may be deployed and may provide coverage extending to any number or areas, regions or sectors. User equipment (UE, not shown) may typically be configured to transmit voice and data traffic to and from the eNB 106. NM 102 may be configured to communicate with the eNBs in the network 100, to monitor the PLMN system behavior performance and to ensure increased efficiency and reliability of the system operation, as will be described in greater detail below.

The NM 102 typically includes computer systems and/or software applications configured to provide and facilitate network support functions to network operators or providers. These support functions may include configuration, performance monitoring and fault detection, and coordinating various operations of the EM 104 and/or eNBs 106A, 106B, . . . , 106n. The EM 104 may be configured to provide both element and domain management function for a sub-network, and to provide a set of end-user functions for management of a set of related types of network elements, for example, the eNBs 106A, 106B, . . . , 106n. The NM 102, the EM 104, and eNB 106n may include interface circuitry to enable communication. In one example, the interface may include a type 2 interface 118. The type 2 interface 118 may be defined by the aforementioned 3GPP standard and/or a user defined (e.g., proprietary) interface protocol. The EM 104 and the eNBs 106A and 106B may also include interface circuitry to enable communication there between. In one example, the interface may include a type 1 interface 116. The type 1 interface 116 may be defined by the aforementioned 3GPP standard and/or a user defined (e.g., proprietary) interface protocol. The EM 104 may also be configured to provide message translation between the type 1 interface 116 and the type 2 interface 118.

Each eNB 106A, 106B, . . . , 106n may include a plurality of modules each generally operable to control the coverage and/or capacity of a cell. Using eNB 106A as an example, an energy saving management module (ESM) 114A is generally configured to provide energy management, at least in part, for an associated cell. For example, ESM module 114A may be generally configured to provide functional control over the cell to enter or exit an energy saving state based on, for example, demand requirements or traffic load of the cell, time of day, etc. For example, during the off-peak hours, a LTE cell may be shut down to enter the energy saving state while its UEs may be served by one or more of its neighboring LTE cells that will extend the coverage to cover the cell in the energy saving state. The functional and operational specifications of the ESM module 114A may be generally defined by the aforementioned 3GPP standard. The eNB 106A may also include a cell outage compensation (COC) module 112A generally configured to compensate for cell outage and/or degradation of cell service. For example, when a LTE cell detects it is in outage, a request can be sent to one or more of its neighboring LTE cells to extend the coverage to cover the cell in outage. The functional operational specifications of the COC module 112A may be generally defined by the aforementioned 3GPP standard.

The eNB 106A may also include a capacity and coverage optimization (CCO) module 110A generally configured to optimize the capacity and/or coverage of an associated cell. For example, the CCO module 110A may be generally configured to monitor the cell performance over a period of time. The CCO module 110A may collect and analyze KPI data to determine whether certain problems, such as coverage holes, weak coverage, etc., have occurred in a cell. When a problem is detected, the CCO module 110A may optimize capacity and coverage of an associated cell, for example, by changing one or more parameters of the cell, which may include, for example, downlink transmit power, antenna tilt, antenna azimuth, etc. Capacity and coverage may need to be optimized because of various intrinsic or extrinsic properties of the cell that may adversely affect the operation of the cell and/or a UE within the cell area. Intrinsic and/or extrinsic properties may include, for example, a coverage hole, where a coverage hole is an area where a pilot signal strength is below a threshold which is required by a UE to access the network, or the SINRs of both serving and neighbor cells is below a level needed to maintain the basic service. Coverage holes are usually caused by physical obstructions such as new buildings, hills, or by unsuitable or by unsuitable antenna parameters, or just inadequate RF planning. A UE in coverage hole may suffer from call drop and/or radio link failure. Typical phenomenon of coverage hole is either HO failure happens frequently and cannot be optimized by HO (Handover) parameter optimization or call drop happens frequently and cannot be rescued by RRC (radio resource control) re-establishment.

Intrinsic and/or extrinsic properties may also include, for example, weak coverage that occurs when the pilot signal strength or the SNR (or SINR) of serving cell is below a level needed to maintain a planned performance requirement (e.g. cell edge bit-rate). Another example is pilot pollution caused by interference between crowded cells. For example, in areas where coverage of different cells have significant overlap, interference levels are typically high, power levels are typically high, and thus energy consumption is high and cell performance may be low. Typically in this situation UEs may experience high SNR to more than one cell and high interference levels. Another example is overshoot coverage that occurs when coverage of a cell reaches far beyond what is planned, for example, as an "island" of coverage in the interior of another cell, which may not be a direct neighbor. Reasons for overshoot may be reflections in buildings or across open water, lakes etc. UEs in this area may suffer call drops or high interference. Another example is downlink (DL) and uplink (UL) channel coverage mismatch, for example, where DL channel coverage is larger than UL channel coverage. The UE may suffer UL problems when it moves into the mismatch area.

While these problems may be tolerated to a certain level in a typical wireless network, these problems may adversely impact cell operation, especially when combined with other factors such as frequency of symptoms, duration of symptoms, or affected population. Accordingly, the CCO module 110A is configured to monitor selected variables associated with the operation of a cell, including, for example, UE measurements, performance measurements, alarms, and/or other monitoring information e.g. trace data. UE measurements are typically sent within UE measurement reports and they may indicate the capacity and coverage problem. Capacity and coverage related performance measurements collected at the source and/or target eNB may be used to detect capacity and coverage related issues on the cell level. For example, Minimizing Driver Test (MDT) or HO-related performance measurements may be used also in detecting capacity and coverage related issues on the cell level. Alarms, other monitoring information e.g. trace data can be correlated to get an indication of capacity and coverage problem.

The CCO, COC, and ESM modules may have certain operations (functions) in common. For example, as they may need to change the coverage of a cell in response to various causes. For example, a conflict may occur when the CCO module and the COC module try to change the coverage simultaneously that may result in unstable cell behavior (for example, the CCO module may change the antenna tilt in one direction, and the COC module may change the antenna tilt in another direction.)

The CCO module 110A may determine that one or more parameters (e.g., downlink transmit power, antenna tilt, antenna azimuth, etc.) is to be adjusted to enable optimization of a cell or neighboring cells. The CCO module 110A is configure to generate a message indicative of a proposed status (e.g., active or passive) and a desired action to optimize a cell and/or one or more neighboring cells. The message from the CCO module 114A may be sent to the NM 102 and/or EM 104 to coordinate the current and/or proposed actions by the CCO module 110A, COC module 112A and/or ESM module 114A, as will be described in greater detail below.

As illustrated in FIG. 1, each of the eNBs 106B, . . . , 106n may also include respective CCO modules 110B, . . . , 110n, COC modules 112B, . . . , 112n, and ESM modules 114B, . . . , 114n, where each of these modules are configured to perform operations described herein with respect to a cell associated with the respective eNB and/or neighboring eNBs, as will be described in greater detail below. The various operations, collectively or individually, that may be performed by the CCO modules, COC modules and/or ESM modules may be referred to herein as "SON functions".

The CCO module 110A may generate a status frame indicative of the status of one or more SON functions associated with the CCO module 110A. For example, the CCO module 110A may be configured to generate a cCO-Passive frame to indicate that the CCO module is not performing any SON functions, and a cCOActive frame to indicate the CCO module is performing (or about to perform) a SON function. Similarly, the COC module and ESM module may generate frames to indicate a status, as may be defined by the aforementioned 3GPP standard.

The ESM module 114A, COC module 112A and/or CCO module 110A may attempt to perform an action, or function, to assert control over certain cell parameters, and such control may result in conflicting demands on network resources that may adversely affect the cell and/or neighboring cells. Accordingly, the present disclosure provides a SON coordination module 108 configured to coordinate the operations of the CCO, COC and/or ESM modules of at least one eNB to prevent and/or resolve conflicts that may arise. In one example network, the SON coordination module 108 may be deployed in the NM 102, thus enabling global coordination control over a plurality of eNBs associated with the network 100. In other example embodiments, the SON coordination module 108 may be deployed in the EM 104, thus enabling local coordination control over one or more eNBs in the domain associated with EM 104. In still other example embodiments, the SON coordination module 108 may be deployed in an eNB, e.g., eNB 106n, thus enabling local coordination control over a specific eNB (for example, edge of network deployment). Examples of the operation of the SON coordination module 108 are described in greater detail below.

Figure 2:
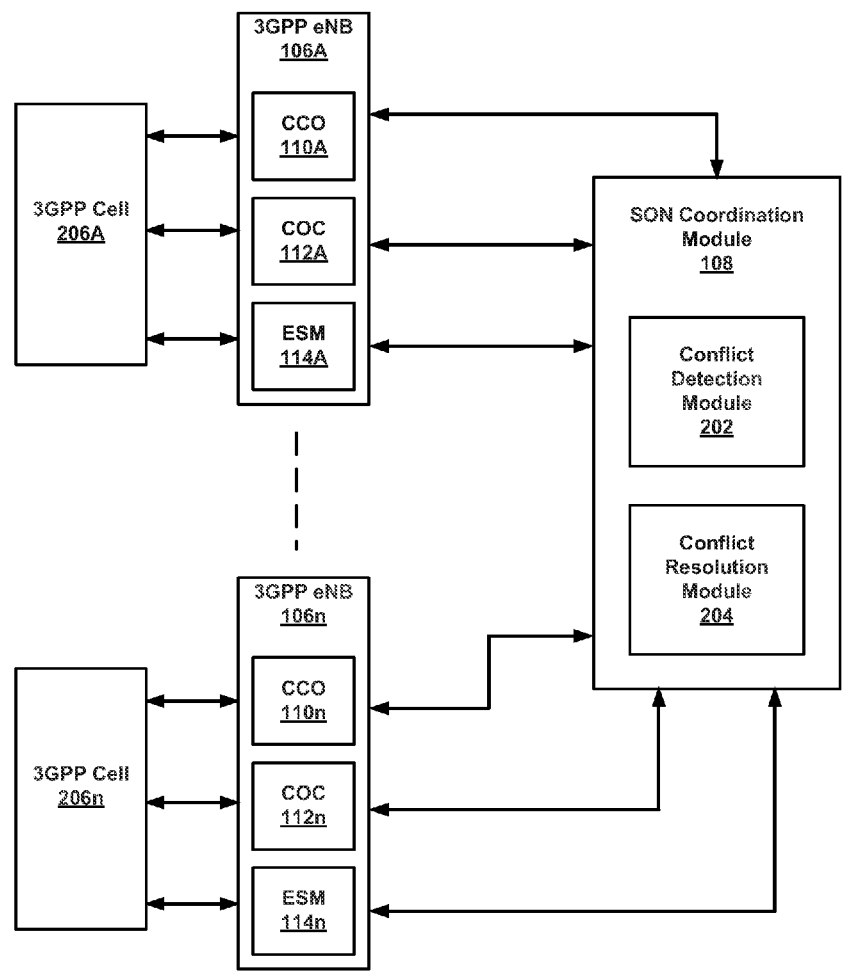
FIG. 2 illustrates a wireless network system according to one example embodiment of the present disclosure.

FIG. 2 illustrates a wireless network system 200 according to one example embodiment of the present disclosure. In this example system 200, the SON coordination module 108 is configured to coordinate SON functions of a plurality of eNBs 106A, . . . 106n, to detect and/or resolve conflicts between SON functions within a given eNB and/or detect and/or resolve conflicts between SON functions of a plurality of eNBs. Each eNB 106A, . . . , 106n may serve a respective cell coverage area, denoted by respective cells 206A, . . . , 206n. The SON coordination module 108 includes a conflict detection module 202 configured to detect one or more existing and/or potential conflicts between the SON functions in and/or among eNBs 106A, . . . , 106n. The SON coordination module 108 also includes a conflict resolution module 204 configured to resolve a current or potential conflict between two or more SON functions.

In operation, the CCO, COC and/or ESM modules may query the conflict detection module 202 for permission before changing or asserting one or more cell configuration parameters. The conflict detection module 202 may apply one or more rules to determine, for example, if a conflict may arise between a specific function (operation) and other SON functions, on a cell or neighboring cells. To make this determination, the conflict detection module 202 may receive information from the eNBs regarding the SON functions. Such information may include, for example, key performance indicators (KPI) that indicate if a given SON function is meeting a defined target of improving network performance, unacceptable oscillations in configuration parameters, etc.

To determine a potential conflict among two or more SON functions, the conflict detection module 202 may determine for example, if a SON function is modifying configuration parameters (including information about vendor, release etc.), configuration parameters intended to be changed and/or their existing and proposed new values, the time duration of a SON function and/or how long the configuration parameter should not be interfered with ("impact time"), the current state of the SON functions, the cell target or targets which a proposed SON function may impact, the state of certain managed objects (e.g., cCOStatus, COCStatus, ESMStatus, etc.), etc. The conflict detection module 202 may also determine the possible impact of a parameter change may have on other objects ("impact area"), possible impact of the parameter change on key performance indicators, priority of SON functions, which can be used to determine the execution order of requests from different SON functions, etc. If a potential or existing conflict is detected, the conflict detection module 202 is configured to signal the conflict resolution module 204 to resolve the conflict.

The conflict resolution module 204 is configured to resolve a conflict between SON functions (proposed or existing) by applying resolution rules to enable, disable, and/or suspend certain SON functions and/or stop, suspend and/or modify certain SON actions. The resolution module 204, generally, is configured to resolve conflicts between SON functions so that cell coverage and/or capacity is optimized, e.g., so that a maximum number of UEs within each cell obtain maximum coverage, and cell behavior stability is maintained. Modification of a selected SON function may include, for example, preventing parameter changes by one or more SON functions for a specified time period after the same parameter has been changed by another SON function, etc. In some embodiments, the SON coordination module 108 may be configured to receive information from one or more eNB pertaining to the actions taken by the conflict resolution module 204 to resolve a current or potential conflict, e.g., determining if a selected SON function is successful or unsuccessful, etc.

Defined resolution rules may include, for example, first-in-first-out (FIFO) rules coordination where an operation request from one module gets priority over other, later, operation requests, CCO-centric rules coordination where operation requests made by a CCO module get general priority over operation requests from the ESM and/or COC modules, preset priority rules where certain functions are given higher priority over other functions, etc. Of course, these are only example of the types of conflict resolution rules that may be used, and in other embodiments different rules may be employed to optimize, for example, capacity and/or coverage of a given cell or cells. Examples of resolution rules are provided below.

Figure 3:
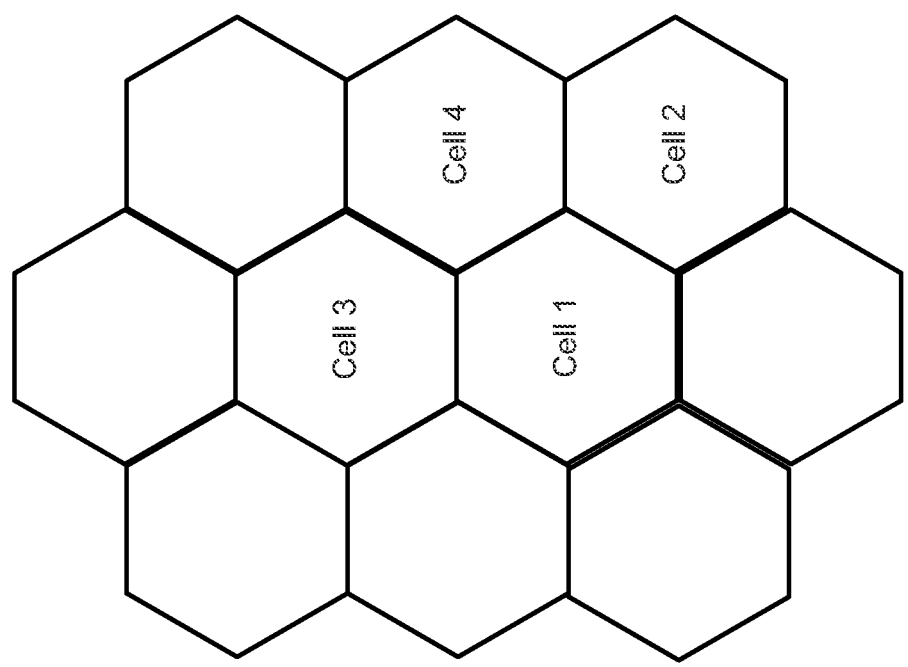
FIG. 3 illustrates an example cell diagram according to various embodiments of the present disclosure.

FIG. 3 illustrates an example cell diagram 300 according to various embodiments of the present disclosure. The cell diagram 300 includes a plurality of cells (e.g., Cell 1, Cell 2, cell 3, cell 4, etc.) each of which may be covered by, at least in part, a respective eNB. With continued reference to FIGS. 1 and 2, the cell diagram 300 will be described in reference to several following examples of resolution rules to resolve a conflict between two or more SON functions.

Example 1

In one example, a conflict may arise between operations of an ESM module and a COC module. Using Cell 1 as an example, the ESM module of Cell 1 may determine that Cell 1 should go into an energy saving state, thus reducing or shutting down the coverage of Cell 1. One or more neighboring cells (e.g., one or more cells surrounding Cell 1) have the ability to cover Cell 1, but one of the neighboring cells detects that such neighboring cell has a cell outage. COC module of the neighboring cell may request that Cell 1 provide compensation. In this scenario, the resolution rules may proscribe that if Cell 1 is already in an energy saving state to leave Cell 1 in the energy saving state, but if Cell 1 has not entered the energy saving state, the energy state of Cell 1 may be delayed until the COC of the candidate cell experiencing a cell recovers from the cell outage and is able to cover Cell 1.

Example 2

In this example, the CCO module, COC module and ESM module may require changes to the coverage and/or capacity of one or more cells during the same time period, which could lead to the following issue:

Cell 1 detects a cell outage of Cell 1, the COC module of Cell 1 may request to compensate the outage of Cell 1 by reconfiguring the RF configuration of one or more compensation candidate cells (neighboring cells), e.g., TX power, antenna tilt and antenna azimuth of Cell 2 and Cell 3. Before the outage Cell 1 is compensated, the CCO module of Cell 2 may detect the degrading of coverage related KPI (e.g., success rate of RRC connection establishments, cell throughput, etc.) of Cell 2. The CCO module of cell 2 may determine that there is a coverage problem in this KPI degraded area. Meanwhile, the ESM module of Cell 2 is operating on Cell 2 to compensate the coverage of its neighboring cell (Cell 4) which is going into an energy saving state.

From the time point at which the outage Cell 1 is detected until Cell 1 has been compensated by Cell 2 and Cell 3, during this period, if there is no coordination among the functions and operations of the COC modules, CCO modules and ESM modules, there will be possibly different settings for adjusting TX power, antenna tilt and antenna azimuth of Cell 2 for COC, CCO or ESM purposes, respectively. Therefore, the adjustment from COC, ESM and optimization from CCO may conflict in the common affected outage compensation candidate cell(s) (Cell 2 in the above example). Thus, the SON coordination module 108 may coordinate the SON functions to avoid conflicts and to ensure adequate capacity and coverage of the cells.

Example 3

In this example, assume the ESM module of Cell 2 is operating on Cell 2 to compensate the coverage of Cell 4 that is in an energy saving state, while Cell 1 detects that Cell 1 has outage, and requests the COC module of Cell 2 to compensate the coverage of Cell 1. Thus, the SON coordination module 108 may coordinate these SON functions to determine if this request can be accepted, and to avoid conflicts and to ensure adequate capacity and coverage of the cells.

Example 4

In this example, assume Cell 1 is compensating to provide coverage for Cell 2 and Cell 2 is in an energy saving state. Assume also that the Cell 1 detects that Cell 1 has an outage. Since Cell 1 is not able to provide the coverage for Cell 2 any more, Cell 2 needs to be covered by another cell, or to deactivate into an energy saving state.

Example 5

Assume that the COC module for Cell 1 is to perform cell outage compensation operations, and the CCO module of Cell 1 is adjusting the RF parameters of Cell 1. To resolve this conflict, the SON coordination module 108 may determine if the status of the CCO module of Cell 1 is active, and if so, the CCO operations may take priority over the COC operations. The CCO module of Cell 1 may change its state to passive after it finishes changing the CCO parameters. In this scenario, the COC module for Cell 1 may perform cell outage compensation operations.

Example 6

To prevent conflicting adjustment from COC modules, ESM modules and/or optimization operations from CCO modules in the common affected cell(s) (e.g., Cell 2 in the FIG. 3), the SON coordination module 108 may determine the cell(s) impact area information. By comparing the priorities of COC modules, CCO modules and/or ESM modules, the SON coordination module may direct the modules to perform the highest-priority action and suspend the low-priority actions on the coordinated cell(s). The priorities of COC modules, CCO modules and/or ESM modules may be preset.

Of course the foregoing examples are merely representative of the types of scenarios that may create a conflict, and of course, the present disclosure is not limited by these examples.

Figure 4:
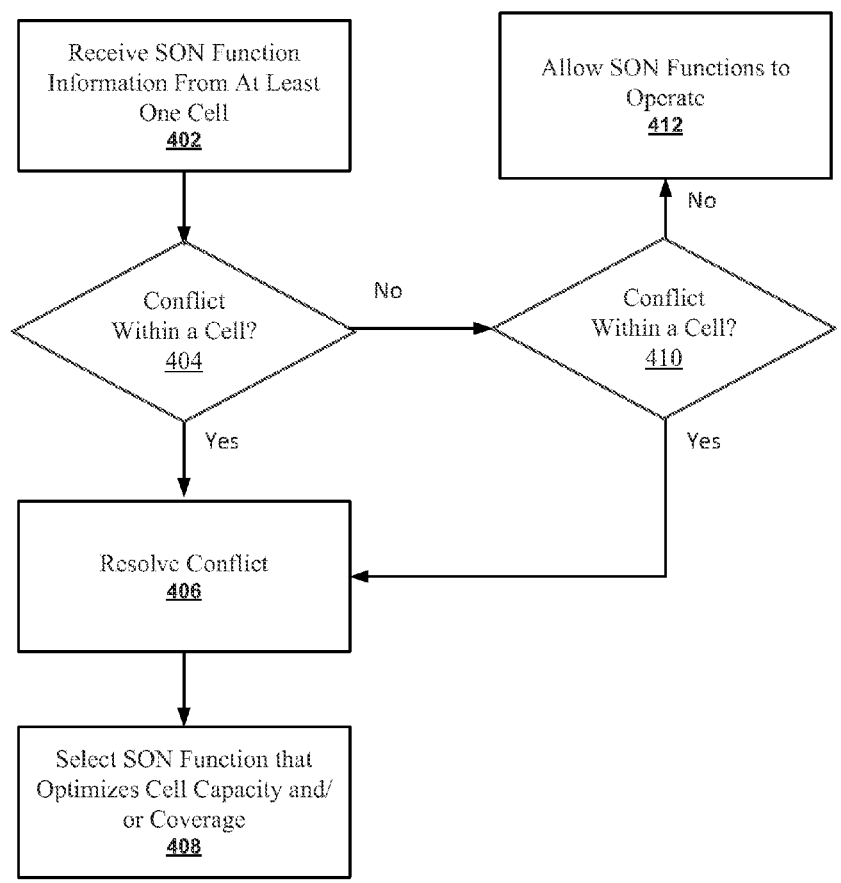
FIG. 4 illustrates a flowchart of operations of an example embodiment consistent with the present disclosure.

FIG. 4 illustrates a flowchart of operations 400 of an example embodiment consistent with the present disclosure. In particular, the flowchart 400 illustrates operations of coordinating carious SON functions. Operations of this embodiment include receiving SON function information from at least one cell 402. Operations also include determining if a conflict exists regarding the SON function information within a cell 404. If a conflict exists within a cell, operations further include resolving the conflict of the SON function information 406 and selecting a function that optimizes the capacity and/or coverage of the cell 408. If no conflict exists within a cell (404), operations also include determining if a conflict exists between SON functions of more than one cell 410. If no conflict exists within a cell or within multiple cells, operations also include directing that the SON functions operate 412. If a conflict exists between multiple cells, operations further include resolving the conflict of the SON function information 406 and selecting a function that optimizes the capacity and/or coverage of the cell 408.

Embodiments of the methods described herein may be implemented in a system that includes one or more storage mediums having stored thereon, individually or in combination, instructions that when executed by one or more processors perform the methods. Here, the processor may include, for example, a system CPU (e.g., core processor) and/or programmable circuitry. Thus, it is intended that operations according to the methods described herein may be distributed across a plurality of physical devices, such as processing structures at several different physical locations. Also, it is intended that the method operations may be performed individually or in a subcombination, as would be understood by one skilled in the art. Thus, not all of the operations of each of the flow charts need to be performed, and the present disclosure expressly intends that all sub-combinations of such operations are enabled as would be understood by one of ordinary skill in the art.

The storage medium may include any type of tangible storage device, for example, any type of disk including floppy disks, optical disks, compact disk read-only memories (CD-ROMs), compact disk rewritables (CD-RWs), digital versatile disks (DVDs) and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions.

"Circuitry", as used in any embodiment herein, may comprise, for example, singly or in any combination, hardwired circuitry, programmable circuitry, state machine circuitry, and/or firmware that stores instructions executed by programmable circuitry. An app may be embodied as code or instructions which may be executed on programmable circuitry such as a host processor or other programmable circuitry. A "module", as used in any embodiment herein, may be embodied as circuitry, software, instruction sets, code (e.g., source code, executable code, etc), etc. The circuitry may be embodied as an integrated circuit, such as an integrated circuit chip.

Thus, the present disclosure provides devices, methods, systems and computer-readable storage medium for coordinating capacity and coverage optimization of self-organizing networks. The following examples pertain to further embodiments.

According to one aspect there is provided a self-organizing network (SON) coordination module. The SON coordination module may include a conflict detection module configured to receive operational information from at least one capacity and coverage optimization (CCO) module and at least one of an energy savings management (ESM) and/or a cell outage compensation (COC) module, wherein the at least one CCO module and the at least one of the ESM module and/or the COC module are associated with at least one eNodeB (eNB) in communication with the conflict detection module. The conflict detection module is configured to determine a conflict between operational information of the CCO module and at least one of the ESM module and/or the COC module. The SON coordination module may also include a conflict resolution module configured to resolve a conflict between the operational information of the CCO module and at least one of the ESM module and/or the COC module based on, at least in part, one or more conflict resolution rules.

Another example SON coordination module includes the forgoing components and wherein the CCO module is configured to maximize the coverage area of a cell covered by the at least one eNB and maximize the number of UEs within a cell covered by the at least one eNB based on, at least in part, downlink transmit power, antenna tilt or antenna azimuth of the cell.

Another example SON coordination module includes the forgoing components and wherein the COC module is configured to compensate for an outage of a cell covered by the at least one eNB.

Another example SON coordination module includes the forgoing components and wherein the ESM module is configured to expand coverage of a cell associated with the at least one eNB to compensate for a neighboring cell in an energy saving state.

Another example SON coordination module includes the forgoing components and wherein the conflict resolution rules are based on, at least in part, a priority of functions associated with the CCO module, the COC module and/or the ESM module.

Another example SON coordination module includes the forgoing components and wherein the conflict detection module and/or the conflict resolution module are associated with a network manager (NM) in communication with the at least one eNB.

Another example SON coordination module includes the forgoing component and wherein the conflict detection module and/or the conflict resolution module are associated with an element manager (EM) in communication with the at least one eNB.

According to another aspect there is provided a method. The method may include receiving operational information from at least one capacity and coverage optimization (CCO) module and at least one of an energy savings management (ESM) and/or a cell outage compensation (COC) module. The at least one CCO module and the at least one of the ESM module and/or the COC module are associated with at least one eNodeB (eNB). The method of this example may also include determining a conflict between operational information of the CCO module and at least one of the ESM module and/or the COC module. The method of this example may also include resolving a conflict between the operational information of the CCO module and at least one of the ESM module and/or the COC module based on, at least in part, one or more conflict resolution rules and/or a functional state of the CCO module, ESM module and/or COC module.

Another example method includes the forgoing operations and maximizing, by the CCO module, a coverage area of a cell covered by the at least one eNB and maximizing the number of UEs within a cell covered by the at least one eNB based on, at least in part, downlink transmit power, antenna tilt or antenna azimuth of the cell.

Another example method includes the forgoing operations and compensating, by the COC module, for an outage of a cell covered by the at least one eNB.

Another example method includes the forgoing operations and controlling, by the ESM module, to expand coverage of a cell associated with the at least one eNB to compensate for a neighboring cell in an energy saving state.

Another example method includes the forgoing operations and wherein the conflict resolution rules are based on, at least in part, a priority of functions associated with the CCO module, the COC module and/or the ESM module.

Another example method includes the forgoing operations and further includes deploying the conflict detection module and/or the conflict resolution module with a network manager (NM) in communication with the at least one eNB.

Another example method includes the forgoing operations and further includes deploying the conflict detection module and/or the conflict resolution module with an element manager (EM) in communication with the at least one eNB According to another aspect there is provided a wireless network system that includes a network manager configured to exchange commands and data with at least one eNodeB (eNB), where the at least one eNB a coverage area of cell associated with the at least one eNB. The wireless network system may also include a conflict detection module configured to receive operational information from at least one capacity and coverage optimization (CCO) module and at least one of an energy savings management (ESM) and/or a cell outage compensation (COC) module, wherein the at least one CCO module and the at least one of the ESM module and/or the COC module are associated with the at least one eNB in communication with the conflict detection module; the conflict detection module is configured to determine a conflict between operational information of the CCO module and at least one of the ESM module and/or the COC module. The wireless network system may also include a conflict resolution module configured to resolve a conflict between the operational information of the CCO module and at least one of the ESM module and/or the COC module based on, at least in part, one or more conflict resolution rules and/or a functional state of the CCO module, ESM module and/or COC module.

Another example system includes the forgoing components and wherein the CCO module is configured to maximize the coverage area of a cell covered by the at least one eNB and maximize the number of UEs within a cell covered by the at least one eNB based on, at least in part, downlink transmit power, antenna tilt or antenna azimuth of the cell.

Another example system includes the forgoing components and wherein the COC module is configured to compensate for an outage of a cell covered by the at least one eNB.

Another example system includes the forgoing components and wherein the ESM module is configured to expand coverage of a cell associated with the at least one eNB to compensate for a neighboring cell in an energy saving state.

Another example system includes the forgoing components and wherein the conflict resolution rules are based on, at least in part, a priority of functions associated with the CCO module, the COC module and/or the ESM module.

Another example system includes the forgoing components and further includes an element manager (EM) in communication with the NM and the at least one eNB, wherein the conflict detection module and/or the conflict resolution module are deployed in associated with the EM.

According to another aspect there is provided a an eNodeB (eNB) that includes a capacity and coverage optimization (CCO) module configured to maximize the coverage area of a cell covered by the eNB and maximize the number of UEs within the cell covered by the eNB based on, at least in part, downlink transmit power, antenna tilt or antenna azimuth of the cell; and at least one of:

an energy savings management (ESM) module configured to control an energy saving state of a cell covered by the eNB; and/or a cell outage compensation (COC) module configured to compensate for an outage of a cell covered by the eNB.

Another example eNB includes the forgoing components and wherein the CCO module and at least one of the ESM module and/or the COC module to transmit operational information to a network manager (NM) in communication with the eNB, wherein the NM is configured to determine a conflict between operational information of the CCO module and at least one of the ESM module and/or the COC module and resolve the conflict between the operational information of the CCO module and at least one of the ESM module and/or the COC module based on, at least in part, one or more conflict resolution rules.

Another example eNB includes the forgoing components and wherein the conflict resolution rules are based on, at least in part, a priority of functions associated with the CCO module, the COC module and/or the ESM module.

According to another aspect there is provided at least one computer-readable storage medium having instructions stored thereon which when executed by a processor, cause the processor to perform the operations of the method as described in any of the examples above.

According to another aspect there is provided an apparatus including means to perform a method as described in any of the examples above.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A self-organizing network (SON) coordination apparatus, comprising:
a conflict detection circuit to receive first operational information from a capacity and coverage optimization (CCO) circuit and to receive second operational information from an energy savings management (ESM) or a cell outage compensation (COC) circuit, wherein the CCO circuit and the ESM circuit or the COC circuit are associated with an eNodeB (eNB), the eNB to communicate with the conflict detection circuit; the conflict detection circuit to determine a conflict between the first operational information of the CCO circuit and the second operational information of the ESM circuit or the COC circuit; and
a conflict resolution circuit to resolve a conflict between the first operational information of the CCO circuit and the second operational information of the ESM circuit or the COC circuit;
wherein the first operational information of the CCO circuit comprises a status indicator.

2. The SON coordination apparatus of claim 1, wherein the status indicator is to indicate that the CCO circuit is in an active state or a passive state, the active state associated with performance of an SON operation, the passive state associated with completion of an SON operation.

3. The SON coordination apparatus of claim 1, wherein the CCO circuit is to maximize the coverage area of a cell covered by the eNB and maximize the number of User Equipments (UEs) within a cell covered by the eNB based on, at least in part, downlink transmit power, antenna tilt or antenna azimuth of the cell.

4. The SON coordination apparatus of claim 1, wherein the COC circuit is to compensate for an outage of a cell covered by the eNB.

5. The SON coordination apparatus of claim 1, wherein the ESM circuit is to expand coverage of a cell associated with the eNB to compensate for a neighboring cell in an energy saving state.

6. The SON coordination apparatus of claim 1, wherein the conflict resolution circuit to resolve the conflict based on, at least in part, one or more conflict resolution rules.

7. The SON coordination apparatus of claim 6, wherein the conflict resolution rules are based on, at least in part, a priority of functions associated with the CCO circuit and the COC circuit or the ESM circuit.

8. The SON coordination apparatus of claim 1, wherein the conflict detection circuit or the conflict resolution circuit are associated with a network manager (NM) system, the NM system to communicate with the eNB.

9. The SON coordination apparatus of claim 1, wherein the conflict detection circuit or the conflict resolution circuit are associated with an element manager (EM) system, the EM system to communicate with the eNB.

10. At least one non-transitory computer-readable storage medium having instructions stored thereon which when executed by a processor result in the following operations for self-organizing network (SON) coordination, the operations comprising:
receiving first operational information from a capacity and coverage optimization (CCO) circuit and receiving second operational information from an energy savings management (ESM) or a cell outage compensation (COC) circuit, wherein the CCO circuit and the ESM circuit or the COC circuit are associated with eNodeB (eNB);

determining a conflict between the first operational information of the CCO circuit and the second operational information of the ESM circuit or the COC circuit; and resolving a conflict between the first operational information of the CCO circuit and the second operational information of the ESM circuit or the COC circuit based on, at least in part, one or more conflict resolution rules or a functional state of the CCO circuit, ESM circuit or COC circuit;

wherein the received first operational information comprises a status indicator.

11. The computer-readable storage medium of claim 10, wherein the status indicator is to indicate that the CCO circuit is in an active state or a passive state, the active state associated with performance of an SON operation, the passive state associated with completion of an SON operation.

12. The computer-readable storage medium of claim 10, further comprising the operations of maximizing, by the CCO circuit, a coverage area of a cell covered by the eNB and maximizing the number of User Equipments (UEs) within a cell covered by the eNB based on, at least in part, downlink transmit power, antenna tilt or antenna azimuth of the cell.

13. The computer-readable storage medium of claim 10, further comprising the operation of compensating, by the COC circuit, for an outage of a cell covered by the eNB.

14. The computer-readable storage medium of claim 10, further comprising the operation of controlling, by the ESM circuit, to expand coverage of a cell associated with the eNB to compensate for a neighboring cell in an energy saving state.

15. The computer-readable storage medium of claim 10, wherein the conflict resolution rules are based on, at least in part, a priority of functions associated with the CCO circuit and the COC circuit or the ESM circuit.

16. An eNodeB (eNB) apparatus, comprising:
a capacity and coverage optimization (CCO) circuit to maximize the coverage area of a cell covered by the eNB and maximize the number of User Equipments (UEs) within the cell covered by the eNB based on, at least in part, downlink transmit power, antenna tilt or antenna azimuth of the cell; and one of:
an energy savings management (ESM) circuit to control an energy saving state of a cell covered by the eNB; or
a cell outage compensation (COC) circuit to compensate for an outage of a cell covered by the eNB;
wherein the CCO circuit is to transmit first operational information to a network manager (NM) and the ESM circuit or the COC circuit is to transmit second operational information to the NM, the NM to communicate with the eNB;
wherein the first operational information of the CCO circuit comprises a status indicator.

17. The eNB apparatus of claim 16, wherein the NM is to determine a conflict between the first operational information of the CCO circuit and the second operational information of the ESM circuit or the COC circuit and to resolve the conflict between the first operational information of the CCO circuit and the second operational information of the ESM circuit or the COC circuit, based on, at least in part, one or more conflict resolution rules.

18. The eNB apparatus of claim 17, wherein the status indicator indicates whether the CCO circuit is in an active state or a passive state, the active state associated with performance of an SON operation, the passive state associated with completion of an SON operation.

19. The eNB apparatus of claim 16, wherein the conflict resolution rules are based on, at least in part, a priority of functions associated with the CCO circuit and the COC circuit or the ESM circuit.

20. The eNB apparatus of claim 16, wherein the eNB apparatus is included in an eNB system, the eNB system further comprising an antenna.

21. At least one non-transitory computer-readable storage medium having instructions stored thereon which when executed by a processor result in the following operations for eNodeB (eNB) conflict resolution, the operations comprising:
maximizing the coverage area of a cell covered by the eNB and maximizing the number of User Equipments (UEs) within the cell covered by the eNB, by a capacity and coverage optimization (CCO) circuit, based on, at least in part, downlink transmit power, antenna tilt or antenna azimuth of the cell;
controlling, by an energy savings management (ESM) circuit, an energy saving state of a cell covered by the eNB;
compensating, by a cell outage compensation (COC) circuit, for an outage of a cell covered by the eNB;
transmitting first operational information associated with the CCO circuit to a network manager (NM), the NM to communicate with the eNB; and
transmitting second operational information associated with the ESM circuit or the COC circuit to the NM;
wherein the first operational information of the CCO circuit comprises a status indicator.

22. The computer-readable storage medium of claim 21, wherein the NM is to determine a conflict between the first operational information of the CCO circuit and the second operational information of the ESM circuit or the COC circuit and to resolve the conflict between the first operational information of the CCO circuit and the second operational information of the ESM circuit or the COC circuit, based on, at least in part, one or more conflict resolution rules.

23. The computer-readable storage medium of claim 21, wherein the status indicator indicates whether the CCO circuit is in an active state or a passive state, the active state associated with performance of an SON operation, the passive state associated with completion of an SON operation.

24. The computer-readable storage medium of claim 21, wherein the conflict resolution rules are based on, at least in part, a priority of functions associated with the CCO circuit, and the COC circuit or the ESM circuit.

\* \* \* \* \*